(12) United States Patent
Knisely et al.

(10) Patent No.: US 10,136,309 B2
(45) Date of Patent: Nov. 20, 2018

(54) SPECTRUM ACCESS SERVER SUPPORT OF RESOURCE ASSIGNMENTS BASED ON RADIO ACCESS NETWORK COEXISTENCE INFORMATION

(71) Applicant: QUALCOMM Incorporated, San Diego, CA (US)

(72) Inventors: Douglas Knisely, Seattle, WA (US); Farhad Meshkati, San Diego, CA (US); Mehmet Yavuz, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/371,302

(22) Filed: Dec. 7, 2016

(65) Prior Publication Data

US 2017/0208454 A1   Jul. 20, 2017

Related U.S. Application Data

(60) Provisional application No. 62/278,948, filed on Jan. 14, 2016.

(51) Int. Cl.
| | |
|---|---|
| *H04W 72/00* | (2009.01) |
| *H04W 8/22* | (2009.01) |
| *H04L 5/00* | (2006.01) |
| *H04W 16/14* | (2009.01) |
| *H04W 24/02* | (2009.01) |
| *H04W 60/00* | (2009.01) |
| *H04W 72/08* | (2009.01) |
| *H04W 28/16* | (2009.01) |

(52) U.S. Cl.
CPC .............. *H04W 8/22* (2013.01); *H04L 5/0058* (2013.01); *H04L 5/0091* (2013.01); *H04W 16/14* (2013.01); *H04W 24/02* (2013.01); *H04W 28/16* (2013.01); *H04W 60/00* (2013.01); *H04W 72/082* (2013.01)

(58) Field of Classification Search
CPC .... H04B 7/2606; H04W 36/30; H04W 36/04; H04W 16/32; H04W 16/12; H04W 16/02; H04W 16/14; H04W 88/06; H04W 72/04; H04W 76/02; H04W 24/00
USPC ....... 455/435.1–439, 442–453; 370/328–334
See application file for complete search history.

(56) References Cited

U.S. PATENT DOCUMENTS

| | | |
|---|---|---|
| 8,897,241 B2 | 11/2014 | Vujcic |
| 9,313,674 B2 | 4/2016 | Negus et al. |
| (Continued) | | |

OTHER PUBLICATIONS

International Search Report and Written Opinion—PCT/US2016/065650—ISA/EPO—Mar. 8, 2017.

*Primary Examiner* — Dai A Phuong
(74) *Attorney, Agent, or Firm* — Patterson & Sheridan, LLP (57) ABSTRACT

Aspects of the present disclosure relate to methods and apparatus for spectrum access server support of resource assignments based on radio access network coexistence information. An example method generally includes obtaining information regarding capability of different entities requesting use of the shared radio resources, estimating compatibility between the different entities based on the information, and allocating the shared radio resources to the different entities based on the estimated compatibility.

30 Claims, 4 Drawing Sheets

(56) References Cited

U.S. PATENT DOCUMENTS

| | | | |
|---|---|---|---|
| 9,398,508 B1* | 7/2016 | Velusamy | H04W 36/0061 |
| 9,622,218 B2* | 4/2017 | Lee | H04W 72/04 |
| 2008/0032630 A1* | 2/2008 | Kim | H04L 25/0224 |
| | | | 455/45 |
| 2009/0109910 A1* | 4/2009 | Kim | H04W 72/085 |
| | | | 370/329 |
| 2011/0021236 A1* | 1/2011 | Dinan | H04W 52/262 |
| | | | 455/522 |
| 2012/0120887 A1 | 5/2012 | Deaton et al. | |
| 2012/0165057 A1* | 6/2012 | Kato | H04W 76/15 |
| | | | 455/509 |
| 2014/0177444 A1* | 6/2014 | Varma | H04W 72/0446 |
| | | | 370/236 |
| 2014/0237547 A1 | 8/2014 | Bose | |
| 2015/0049721 A1 | 2/2015 | Wijting et al. | |
| 2015/0237645 A1* | 8/2015 | Andrianov | H04W 72/1215 |
| | | | 370/329 |
| 2015/0245374 A1 | 8/2015 | Mitola, III et al. | |
| 2015/0358968 A1 | 12/2015 | Malladi et al. | |
| 2015/0365945 A1* | 12/2015 | Morioka | H04L 5/0064 |
| | | | 370/329 |
| 2016/0066204 A1* | 3/2016 | Khawer | H04W 72/085 |
| | | | 455/500 |
| 2016/0308636 A1* | 10/2016 | Deng | H04W 72/08 |
| 2016/0366692 A1* | 12/2016 | Kamlani | H04W 24/02 |
| 2017/0127409 A1* | 5/2017 | Mishra | H04W 24/10 |
| 2017/0142742 A1* | 5/2017 | Fischer | H04W 72/1215 |
| 2018/0184342 A1* | 6/2018 | Peisa | H04W 8/245 |
| 2018/0199250 A1* | 7/2018 | Vare | H04W 48/20 |

* cited by examiner

SPECTRUM ACCESS SERVER SUPPORT OF RESOURCE ASSIGNMENTS BASED ON RADIO ACCESS NETWORK COEXISTENCE INFORMATION

CLAIM OF PRIORITY UNDER 35 U.S.C. § 119

This application claims the benefit of U.S. Provisional Patent Application Ser. No. 62/278,948, filed Jan. 14, 2016, which is herein incorporated by reference in its entirety.

FIELD

This application is directed generally to wireless communications systems. More particularly, but not exclusively, the application relates to systems and apparatus for spectrum access server support of resource assignments based on radio access network coexistence information.

BACKGROUND

Wireless communication systems are widely deployed to provide various types of communication content such as voice, data, video, and the like, and deployments are likely to increase with introduction of new data oriented systems such as Long Term Evolution (LTE) systems. Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and other orthogonal frequency division multiple access (OFDMA) systems.

Generally, a wireless multiple-access communication system can simultaneously support communication for multiple wireless terminals (also known as user equipments (UEs), user terminals, or access terminals (ATs)). Each terminal communicates with one or more base stations (also known as access points (APs), eNodeBs, or eNBs) via transmissions on forward and reverse links. The forward link (also referred to as a downlink or DL) refers to the communication link from the base stations to the terminals, and the reverse link (also referred to as an uplink or UL) refers to the communication link from the terminals to the base stations. These communication links may be established via single-in-single-out, single-in-multiple out, multiple-in-single-out, or multiple-in-multiple-out (MIMO) systems.

Newer multiple access systems, for example, LTE, deliver faster data throughput than older technologies. Faster downlink rates, in turn, have sparked a greater demand for higher-bandwidth content, such as high-resolution graphics and video, for use on or with mobile devices. Therefore, demand for bandwidth on wireless communications systems continues to increase despite availability of higher data throughput over wireless interfaces, and this trend is likely to continue. However, wireless spectrum is a limited and regulated resource. Therefore, new approaches are needed in wireless communications to more fully utilize this limited resource and satisfy consumer demand.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for spectrum access server support of resource assignments based on radio access network coexistence information.

In one aspect of the present disclosure, method for allocating shared radio resources by a spectrum access server (SAS) is disclosed. The method generally includes obtaining information regarding capability of different entities requesting use of the shared radio resources, estimating compatibility between the different entities based on the information, and allocating the shared radio resources to the different entities based on the estimated compatibility.

In one aspect of the present disclosure, an apparatus for allocating shared radio resources by a spectrum access server (SAS). The apparatus generally includes at least one processor configured to: obtain information regarding capability of different entities requesting use of the shared radio resources, estimate compatibility between the different entities based on the information, and allocate the shared radio resources to the different entities based on the estimated compatibility. The apparatus also generally includes a memory coupled with the at least one processor.

In one aspect of the present disclosure, an apparatus for allocating shared radio resources by a spectrum access server (SAS). The apparatus generally includes means for obtaining information regarding capability of different entities requesting use of the shared radio resources, means for estimating compatibility between the different entities based on the information, and means for allocating the shared radio resources to the different entities based on the estimated compatibility.

In one aspect of the present disclosure, a non-transitory computer-readable medium for allocating shared radio resources by a spectrum access server (SAS) is disclosed. The non-transitory computer-readable medium generally includes instructions for obtaining information regarding capability of different entities requesting use of the shared radio resources, estimating compatibility between the different entities based on the information, and allocating the shared radio resources to the different entities based on the estimated compatibility.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The present application may be more fully appreciated in connection with the following detailed description taken in conjunction with the accompanying drawings.

DETAILED DESCRIPTION

This disclosure relates generally to providing or participating in authorized shared access between two or more wireless communications systems, also referred to as wireless communications networks. For example, when competing users and wireless communications systems, (e.g., CBSDs) vie for radio resources, there is a challenge presented to protecting these radio resources from each other based on restrictions due to the radio access technologies that are being used and a number of operational aspects for those radio access technologies. In order to solve this challenge and allow the optimization of radio resource assignments among competing radio access services, aspects of the present disclosure propose techniques for allowing spectrum access servers (i.e., the entities in charge of assigning radio resources to CBSDs) to identify compatible radio access networks (e.g., CBRS CBSDs) and optimize the assignment of radio resources among them based on capability information supplied by radio access nodes/networks (e.g., CBRS CBSDs or CBSD Domain Proxies).

In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, GSM networks, as well as other communications networks. As described herein, the terms "networks" and "systems" may be used interchangeably.

A CDMA network may implement a radio technology such as Universal Terrestrial Radio Access (UTRA), cdma2000, and the like. UTRA includes Wideband-CDMA (W-CDMA) and Low Chip Rate (LCR). Cdma2000 covers IS-2000, IS-95, and IS-856 standards.

A TDMA network may implement a radio technology such as Global System for Mobile Communications (GSM). 3GPP defines standards for the GSM EDGE (Enhanced Data Rates for GSM Evolution) Radio Access Network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the Public Switched Telephone Network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different Radio Access Technologies (RATs) and Radio Access Networks (RANs).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different Radio Access Technologies or Radio Air Interfaces. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may use time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g., sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer-readable medium for execution on a processor or computer. Furthermore, an aspect may comprise at least one element of a claim.

Figure 1:
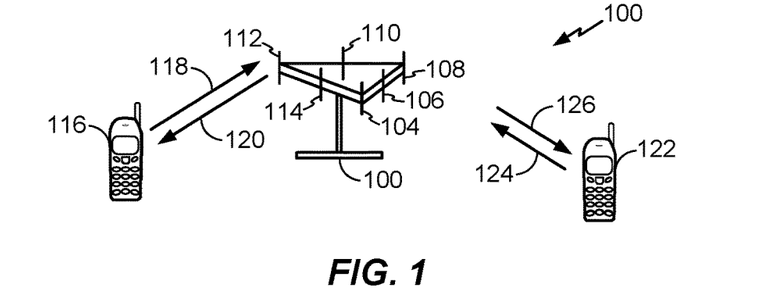
FIG. 1 illustrates details of a wireless communication system, according to certain aspects of the present disclosure.

FIG. 1 illustrates details of an implementation of a multiple access wireless communication system, which may be an LTE system, on which aspects as further described subsequently may be implemented. An evolved NodeB (eNB) 100 (also known as a base station, access point or AP) may include multiple antenna groups, one including 104 and 106, another including 108 and 110, and an additional including 112 and 114. In FIG. 1, only two antennas are shown for each antenna group; however, more or fewer antennas may be utilized for each antenna group. A user equipment (UE) 116 (also known as an user terminal, access terminal, or AT) is in communication with antennas 112 and 114, where antennas 112 and 114 transmit information to UE 116 over forward link (also known as a downlink) 120 and receive information from UE 116 over reverse link (also known as an uplink) 118. A second UE 122 may be in communication with antennas 104 and 106, where antennas 104 and 106 transmit information to UE 122 over forward link 126 and receive information from UEs 122 over reverse link 124.

In a frequency division duplex (FDD) system, communication links 118, 120, 124 and 126 may use different frequencies for communication. For example, forward link 120 may use a different frequency then that used by reverse link 118. In a time division duplex (TDD) system, downlinks and uplinks may be shared.

Each group of antennas and/or the area in which they are designed to communicate is often referred to as a sector of the eNB. Antenna groups each are designed to communicate to UEs in a sector of the areas covered by eNB 100. In communication over forward links 120 and 126, the transmitting antennas of eNB 100 utilize beamforming in order to improve the signal-to-noise ratio of forward links for the different UEs 116 and 122. Also, an eNB using beamforming to transmit to UEs scattered randomly through its coverage causes less interference to UEs in neighboring cells than an eNB transmitting through a single antenna to all its UEs. An eNB may be a fixed station used for communicating with the UEs and may also be referred to as an access point, a Node B, or some other equivalent terminology. A UE may also be called an access terminal, AT, user equipment, wireless communication device, terminal, or some other equivalent terminology. UEs, such as UE 116 and 122, may be further configured to operate with other nodes of other communication networks (not shown), such as, for example, GERAN and/or UTRAN networks. Moreover, base stations, such as eNB 100, may be configured to facilitate handover of served UEs to base stations of the other networks, such as through use of a redirection command.

Figure 2:
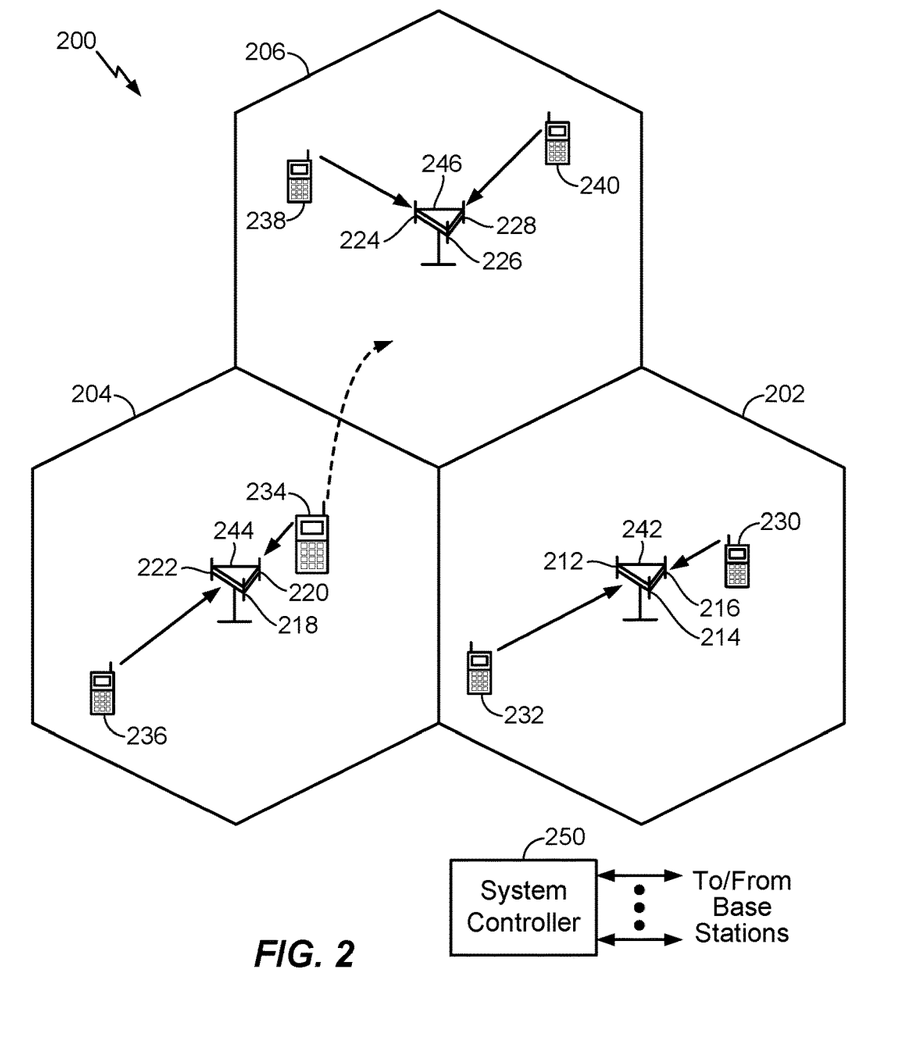
FIG. 2 illustrates details of a wireless communication system having multiple cells, according to certain aspects of the present disclosure.

FIG. 2 illustrates details of an implementation of a multiple access wireless communication system 200, such as an LTE system, on which aspects, such as are described subsequently herein, may be implemented. The multiple access wireless communication system 200 includes multiple cells, including cells 202, 204, and 206. In one aspect, the cells 202, 204, and 206 may include an eNB that includes multiple sectors. The multiple sectors can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 each correspond to a different sector. In cell 206, antenna groups 224, 226, and 228 each correspond to a different sector. The cells 202, 204, and 206 can include several wireless communication devices (e.g., user equipment or UEs) which can be in communication with one or more sectors of each cell 202, 204, or 206. For example, UEs 230 and 232 can be in communication with eNB 242, UEs 234 and 236 can be in communication with eNB 244, and UEs 238 and 240 can be in communication with eNB 246.

The cells and associated base stations may be coupled to a system controller 250, which may be part of a core or backhaul network or may provide connectivity to a core or backhaul network, including, for example, an MME and SGW, such as may be used to perform functions as further described herein related to multimode coordination and operation, as well as other aspects described herein.

An operator's system may include multiple networks, which may be of multiple types (for example, in addition to the LTE network configurations shown in FIGS. 2 and 3) using different RATs. For example, one type may be an LTE system, which is data-centric. Another type may be a UTRAN system, such as a W-CDMA system. Yet another type may be a GERAN system, which may in some cases be Dual Transfer Mode (DTM) capable (also denoted herein as a DTM GERAN). Some GERAN networks may be non-DTM capable. Multimode user terminals, such as UEs, may be configured to operate in multiple networks, such as these, as well as other (e.g., WiFi or WiMax networks, etc.).

Authorized Shared Access

Authorized shared access (ASA) allocates, to a secondary user(s), portions of spectrum that are not continuously used by an incumbent system(s). The incumbent system may be referred to as a primary licensee or a primary user that is given a primary license for a band of frequencies. The incumbent system may not use the entire frequency band in all locations and/or at all times. The secondary user may be referred to as a secondary licensee or a secondary network. Aspects of the present disclosure are directed to an ASA implementation. Still, the ASA technology is not limited to the illustrated configurations as other configurations are also contemplated. The ASA spectrum refers to portions of a spectrum that are not used by a primary user and has been licensed for use by a secondary user, such as an ASA operator. ASA spectrum availability may be specified by location, frequency, and/or time. It should be noted that the authorized shared access may also be referred to as licensed shared access (LSA).

ASA Architecture

Figure 3:
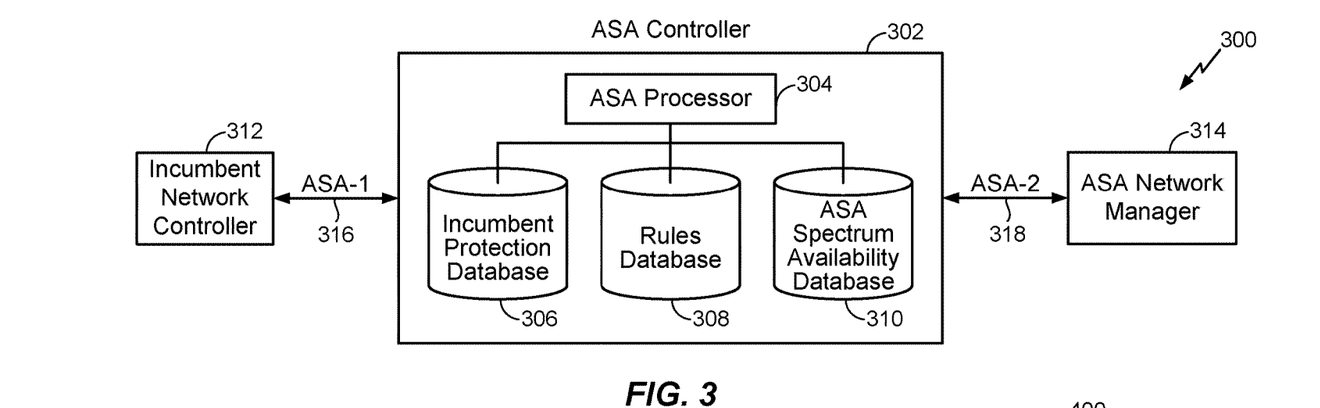
FIG. 3 is a block diagram showing aspects of an Authorized Shared Access (ASA) controller coupled to different wireless communication systems including one primary user and one secondary user, according to certain aspects of the present disclosure.

In one configuration, as shown in FIG. 3, an ASA architecture 300 includes an ASA controller 302 coupled to an incumbent network controller 312 of a primary user and an ASA network manager 314 of an ASA network. The primary user may be a primary ASA licensee and the ASA network may be a secondary user.

In one configuration, the incumbent network controller is a network entity operated by the primary user that controls and/or manages the network operating in the ASA spectrum. Furthermore, the ASA network manager may be a network entity operated by the ASA network operator that controls and/or manages an associated network, including but not limited to the devices operating in the ASA spectrum. Additionally, the secondary licensee may be a wireless network operator that has obtained an ASA license to use the ASA spectrum. Furthermore, in one configuration, the ASA controller is a network entity that receives information from the incumbent network controller on the available ASA spectrum that may be used by an ASA network. The ASA controller may also transmit control information to the ASA network manager to notify the ASA network manager of the available ASA spectrum.

In the present configuration, the incumbent network controller 312 is aware of the use of the ASA spectrum by the primary user at specified times and/or locations. The incumbent network controller 312 may provide information to the ASA controller 302 for the incumbent usage of the ASA spectrum, for example, such as capability information of one or more radio access networks (e.g., CBSDs). There are several methods that the incumbent network controller 312 can use to provide this information to the ASA controller 302. In one configuration, the incumbent network controller 312 provides a set of exclusion zones and/or exclusion times to the ASA controller 302. In another configuration, the incumbent network controller 312 specifies a threshold for allowed interference at a set of locations. The threshold for allowed interference may be referred to as incumbent protection information. In this configuration, the incumbent protection information is transmitted to the ASA controller 302 over an ASA-1 interface 316. Incumbent protection information may be stored by the ASA controller 302 in a database 306.

The ASA-1 interface refers to the interface between the primary user and the ASA controller. The ASA-2 interface refers to the interface between the ASA controller and the ASA network management system. Moreover, the ASA-3 interface refers to the interface between the ASA network manager and the ASA network elements. Furthermore, geographic sharing refers to an ASA sharing model in which the ASA network can operate throughout a geographic region for an extended period of time. The network is not permitted to operate in regions specified by exclusion zones.

Figure 6:
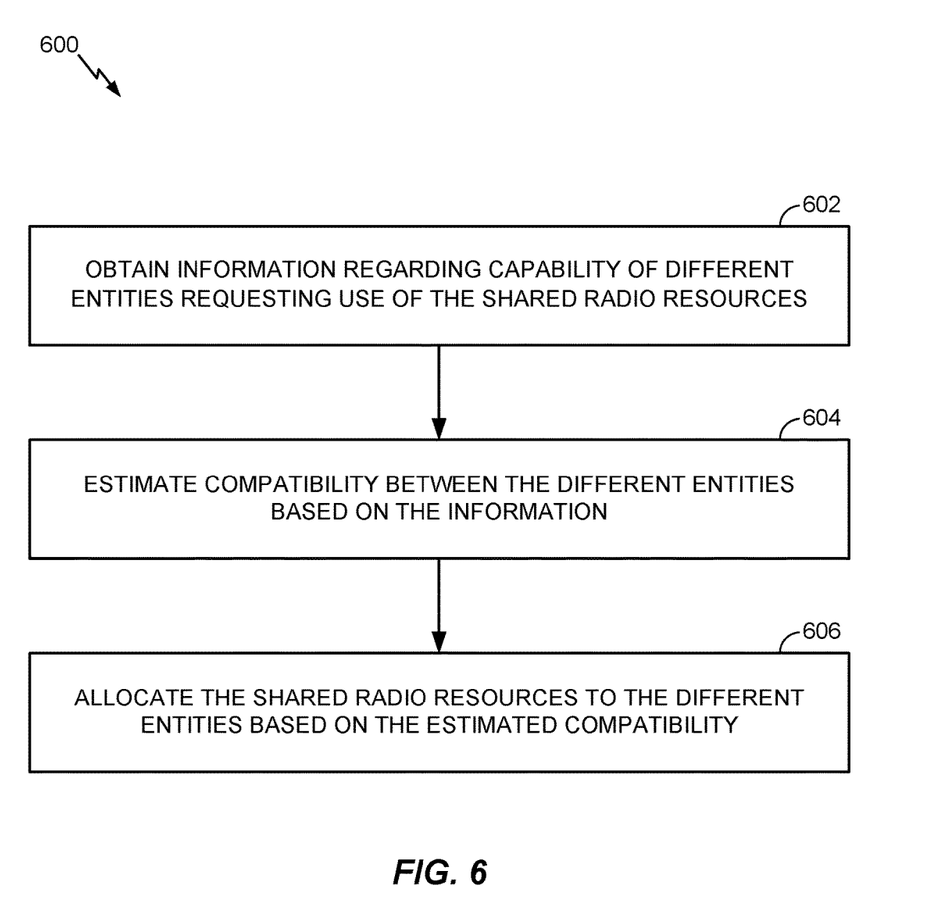
FIG. 6 illustrates example operations for allocating shared radio resources, according to certain aspects of the present disclosure.

The ASA controller 302 uses the information (e.g., capability information) from the incumbent network controller 312 to determine the ASA spectrum that may be used by the ASA network (e.g., according to operations 600 illustrated in FIG. 6). That is, the ASA controller 302 determines the ASA spectrum that may be used for a specific time and/or a specific location based on rules specified in a rules database 308. For example, in some cases, the network controller may determine the ASA spectrum based on compatibility information of one or more radio access networks. For example, based on the compatibility information, the network controller may estimate compatibility between the one or more radio access networks, and may allocate resources based on the estimated compatibility, for example, as discussed in greater detail below.

The rules database 308 may be accessed by an ASA processor 304 and stores the regulatory rules that are set by local regulations. These rules may not be modified by the ASA-1 or the ASA-2 interfaces, and may be updated by the individual or organization that manages the ASA controller 302. The available ASA spectrum, as calculated by the rules in the rules database 308, may be stored in the ASA spectrum availability database 310.

The ASA controller 302 may send information to the ASA network manager 314 on the available ASA spectrum via an ASA-2 interface 318, based on the spectrum availability database. The ASA network manager 314 may know or determine the geographic location of base stations under its control and also information about the transmission characteristics of these base stations, such as transmit power and/or supported frequencies of operation. The ASA network manager 314 may query the ASA controller 302 to discover the available ASA spectrum in a given location or a geographic region. Also, the ASA controller 302 may notify the ASA network manager 314 of any updates to the ASA spectrum availability in real-time. This allows the ASA controller 302 to notify the ASA network manager 314 if the ASA spectrum is no longer available, so that the ASA network can stop using that spectrum and the incumbent network controller 312 can obtain exclusive access to the ASA spectrum in real time.

The ASA network manager 314 may be embedded in a standard network element, depending on the core network technology. For example, if the ASA network is a long term evolution (LTE) network, the ASA network manager can be embedded in an operations, administration, and maintenance (OAM) server.

Figure 4:
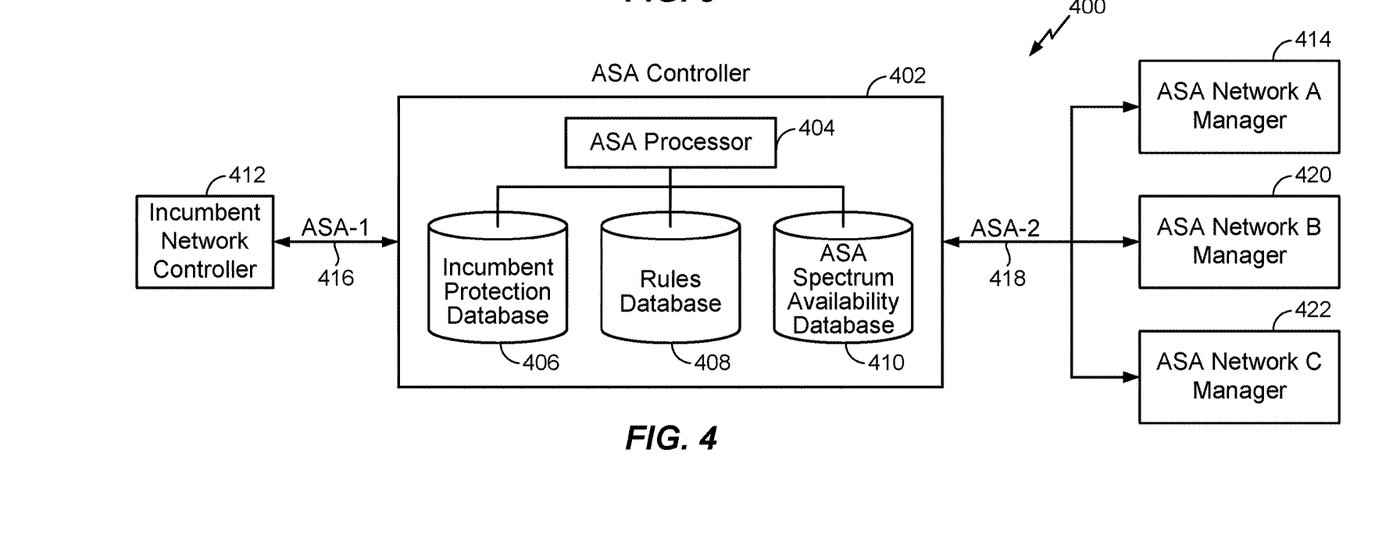
FIG. 4 is a block diagram showing aspects of an ASA controller coupled to different wireless communication systems including one primary user and multiple secondary users, according to certain aspects of the present disclosure.

In FIG. 4, an incumbent network controller and a single ASA network manager are illustrated as being coupled to the ASA controller. It is also possible for multiple ASA networks (e.g., ASA network A, ASA network B and ASA network C) to be connected to an ASA controller 402, as in a system 400 shown in FIG. 4. ASA network A includes an ASA network A manager 414 coupled to the ASA controller 402, ASA network B includes an ASA network B manager 420 coupled to the ASA controller 402, and ASA network C includes an ASA network C manager 422 coupled to the ASA controller 402.

In this example, the multiple ASA networks may share the same ASA spectrum. The ASA spectrum may be shared via various implementations. In one example, the ASA spectrum is shared for a given region, so that each network is restricted to a subband within the ASA spectrum. In another example, the ASA networks share the ASA spectrum by using timing synchronization and scheduling the channel access of the different networks.

The system 400 may further include an incumbent network controller 412 of a primary user communicating with the ASA controller 402 via an ASA-1 interface 416, to provide incumbent protection information for a database 406. The ASA controller 402 may include a processor 404 coupled to a rules database 408 and ASA spectrum availability database 410. The ASA controller 402 may communicate with the ASA network managers 414, 420 and 422 via an ASA-2 interface 418. The ASA networks A, B, C may be secondary users.

Figure 5:
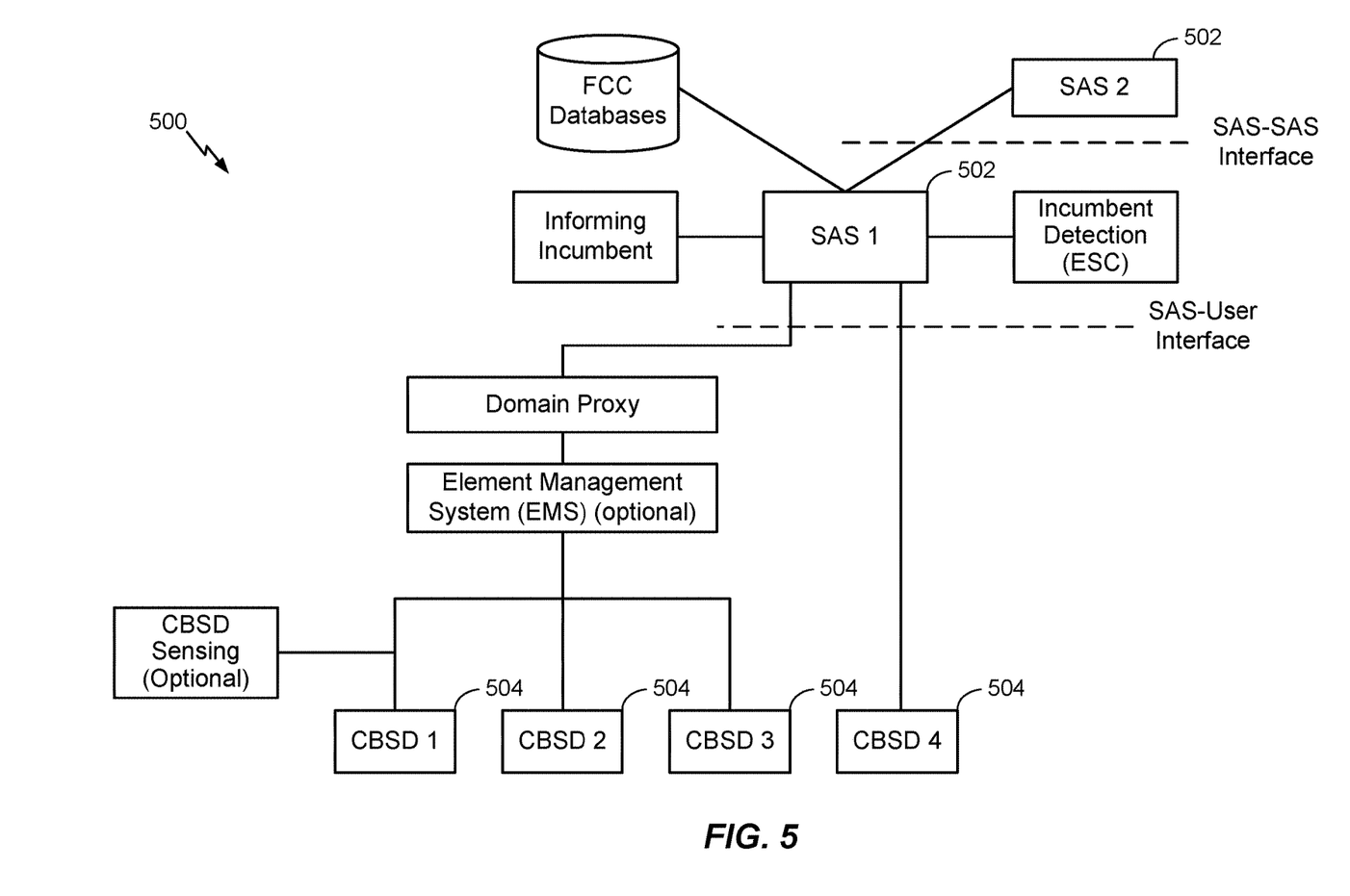
FIG. 5 illustrates an example architecture of a spectrum sharing system, according to certain aspects of the present disclosure.

The ASA network manager(s) may interact with various network elements, such as eNodeBs, to achieve the desired spectrum use control. The interaction may be implemented via the ASA-3 interface as shown in FIG. 5. As shown in FIG. 5, a system 500 includes ASA-3 interfaces between the eNodeBs 516, 518 in the Radio Access Network 512 and an ASA network manager node embedded in an operations, administration, and maintenance server 510. The Radio Access Network 512 may be coupled to a core network 514. An ASA controller 502 may be coupled to the operations, administration, and maintenance server 510 via an ASA-2 interface 508 and to a network controller of a primary user 504 via an ASA-1 interface 506.

In some cases, multiple incumbent network controllers are specified for the same ASA spectrum. That is, a single incumbent network controller may provide information about incumbent protection for a given ASA frequency band. Therefore, the architecture may be limited to a single incumbent network controller. However, it is noted that multiple incumbent network controllers may be supported. Still, it may be desirable to limit the network to a single incumbent network controller.

Example Spectrum Access Server Support for Resource Assignments Based on Radio Access Network Coexistence Information Spectrum sharing systems, such as Authorized Shared Access noted above and illustrated in FIGS. 3 and 4, allow for radio resources (e.g., operating frequency, power limits, and geographic areas) to be assigned dynamically among multiple users and service providers while providing some degree of protection of other users/service providers and incumbent users that potentially have higher priority (e.g., fixed satellite systems, WISPs, and government/military systems).

FIG. 5 illustrates an example architecture of a spectrum sharing system 500, according to certain aspects of the present disclosure. As illustrated, the spectrum sharing system 500 may comprise one or more Spectrum Access Servers (SASs) 502a and 502b (e.g., an ASA Controller, such as the ASA Controller 302 or 402) that accept requests for radio resources from one or more Citizens Broadband Radio Service Devices (CBSDs) 504, resolve conflicts or over-constraints in those requests, and grant the use of resources to radio access services.

When competing users and radio systems (e.g., CBSDs) vie for radio resources, there is a challenge of protecting these radio resources from each other based on restrictions due to the radio access technologies that are being used and a number of operational aspects for those radio access technologies. For example, some users/system operators may be able to coexist in the same or neighboring radio channels based on their use of the same (or compatible) radio technologies, compatible Self Organizing Network technologies, synchronized timing, common operational parameters (e.g., TDD slot structures, common radio silence intervals, etc.), and access to the same Core Networks for seamless mobility, etc.

In order to solve this challenge of protecting these radio resources and allow SASs to optimize radio resource assignments among competing radio access services, aspects of the present disclosure propose techniques for allowing Shared Spectrum system SASs to identify compatible radio access networks (e.g., CBRS CBSDs) and optimize the assignment of radio resources among them based on capability information supplied by radio access nodes/networks (e.g., CBRS CBSDs or CBSD Domain Proxies). According to aspects, allocating shared radio resources in this manner (e.g., based on capability information) is advantageous in that it allows the SAS to estimate compatibility between different radio access networks and allocate the same shared resources to radio access networks that are compatible with each other while allocating different shared resources to radio access networks that are less compatible, for example, as described below in greater detail. According to certain aspects, allocating radio access networks that are less compatible different shared resources helps reduce interference, thus improving reliability of these radio access networks.

FIG. 6 illustrates example operations 600 for allocating shared radio resources. According to certain aspects, example operations 600 may be performed, for example, by a SAS (e.g., one or more of the SASs illustrated in FIG. 5).

Operations 600 begin at 602 by obtaining information regarding capability of different entities requesting use of the shared radio resources. According to aspects, the capability information may be obtained, for example, via one or more physical or wireless connections from the different entities. At 604, the SAS estimates compatibility between the different entities based on the information. At 606, the SAS allocates the shared radio resources to the different entities based on the estimated compatibility. Additionally, while not illustrated, operations 600 may also comprise transmitting (e.g. via one or more physical or wireless connections) an indication to each of the different entities indicating the allocated shared radio resources.

According to certain aspects, the capability information noted above may be obtained as part of a registration process (e.g., between one or more of the different entities (e.g., CBSDs) and the SAS) or via at least one of resource requests from radio access networks/nodes or periodic status updates from the radio access networks/nodes. In some cases, these periodic status updates may include radio environment measurements performed by one or more radio access networks/nodes.

According to certain aspects, the capability information obtained, for example, via requests from radio access systems (e.g., CBSDs in the US 3.5 GHz CBRS band, but equally applicable to other share spectrum systems used in other regions) can be evaluated by the SASs against capability information supplied by other radio access nodes/networks to permit assignments of the most compatible systems on the same or adjacent channels, to operate at higher power levels, or to be assigned to the same channels at geographic boundaries between service areas. Conversely, radio access nodes/networks that are determined by the capability information to be less compatible (e.g., radio access nodes/networks that would interfere with each other) can be assigned to radio channels that are non-adjacent, can be provided guard bands, ordered to operate at lower power levels, or can be geographically separated from each other.

According to certain aspects, the capability information supplied by radio access nodes/networks may comprise various types of information, such as a radio technology in use at the radio access node (e.g., LTE). According to certain aspects, information indicating the radio technology in use at the radio access node may comprise a name or code that represents the technology.

The capability information may also comprise a variant of the radio technology at use (e.g., another release of LTE, LTE-Unlicensed, license assisted access (LAA), LTE/WiFi Aggregation (LWA), MuLTEfire, etc.). According to certain aspects, the information regarding the variant of the radio technology at use may comprise a name or code representing the variant technology.

The capability information may also comprise self-organizing network (SON) capabilities for a radio access node/network (e.g., compatible with Small Cell Forum SON guidelines, compatible with standardized or proprietary SON versions). According to certain aspects, the information regarding the SON capabilities may comprise a coded value that may be agreed upon or administered by a recognized registrar (e.g., an industry standards organization).

The capability information may also comprise timing and synchronization capabilities (e.g., capability to synchronize to a global navigation satellite system (GNSS), ability to listen for and synchronize with different radio access nodes in the same system or with different systems). According to certain aspects, the information regarding the timing and synchronization capabilities may comprise coded values codified by and/or registered and shared by a public registrar (e.g., an industry standards organization).

The capability information may also comprise radio access technology operating parameters (e.g., TDD slot structure, silence intervals, etc.). According to certain aspects, the information regarding radio access technology operating parameters may comprise a standard structure specific to each radio technology and variant representing the coded values for each of their appropriate operating parameters (e.g. based on 3GPP signaling and PHY/MAC specifications for LTE and LTE variants).

The capability information may also comprise membership in a particular system (e.g., provided by one or more system operators and supporting tightly integrated operation). According to certain aspects, the information regarding membership in a particular system may be composed of a mobile network identifier (MNID) and/or an arbitrary bit string and/or zone identifier chosen by the user/system operator, where more bits set to common values semantically means closer compatibility (abstractly and determined by the user/system operator with no additional semantics for the SASs).

The capability information may also comprise an ability to access one or more core networks (CNs). According to certain aspects, the information regarding ability to access one or more core networks may comprise a list of CN identifiers, Neutral Host service providers, or other accessible/supported network services. Additionally the information regarding ability to access one or more core networks may be coded according to industry standard or registered with a public registrar (e.g., industry standards organization).

The capability information may also comprise an ability to support (seamless or session level) mobility with one or more other systems (e.g., operated by other providers). According to certain aspects, the information regarding ability to support mobility with one or more other systems may be similar to CN and system membership indicators.

The capability information may also comprise listen-before-talk (LBT) capabilities and LBT compatibility rules, which may be coded indicator of recognized and/or standardized LBT capabilities established by some industry standards organization.

The capability information may also comprise an ability to support automatic traffic redirection among multiple radio channels, which may comprise boolean or a coded value representing one or more of various supported traffic redirection mechanisms The capability information may also comprise an ability to support automatic transmit power control based on dynamically changing radio interference conditions (and over what range of power levels), which may comprise boolean or a coded value representing one or more of various supported transmit power control mechanisms.

The capability information may also comprise carrier aggregation capabilities across multiple assigned radio channels, which may comprise an enumeration of one or more supported carrier aggregation modes, e.g., based on the CA modes defined by 3GPP for LTE variants.

While the above provides an extensive list of information that could be included in capability information, it should be noted that other information regarding the capabilities of radio access nodes/networks may also be included within the capability information as well.

According to certain aspects, the capability information may be represented in various ways to allow a correlation of capability information between different entities (radio access nodes/networks) to determine a "score" or estimator of compatibility between the different entities. For example, a capability score may comprise a multi-dimensional metric for indicating the capabilities and likelihood for at least two entities to coordinate interference and usage of shared radio resources among themselves. According to certain aspects, this score/estimator may be used as a discreet decision factor for potentially interfering radio resource assignments or used as a bias factor against (or for) potentially interfering radio resource assignments. According to certain aspects, a SAS may use the capability information, for example, as noted above, to determine whether to assign "more compatible" radio nodes/systems to common channels or neighboring channels (with zero or small guard bands) and to permit those nodes/systems to operate at higher transmit power levels. Additionally, the SAS, based on the capability information, may decide to assign "less compatible" radio nodes/ systems to different channels (whenever possible) and limit these radio nodes/systems to lower transmit power levels. Additionally, the compatibility score or estimator may be used to avoid assignment of less compatible radio nodes/systems at adjacent geographic boundaries between service assignment areas (e.g., census tracts for US 3.5 GHz CBRS systems).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for obtaining, means for estimating, means for allocating, and/or means for transmitting may comprise an ASA controller (e.g., ASA controller 203) and/or one or more processors, such as the ASA processor 304 and/or ASA processor 404.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 116 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files.

Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for allocating shared radio resources by a spectrum access server (SAS), comprising:
   obtaining information regarding capability of different radio access nodes requesting use of the shared radio resources;
   estimating compatibility between the different radio access nodes based on the information; and
   allocating the shared radio resources to the different radio access nodes based on the estimated compatibility.

2. The method of claim 1, wherein the information comprises an indication of a radio access technology (RAT) of the different radio access nodes and operating parameters associated with the RAT.

3. The method of claim 2, wherein the operating parameters associated with the RAT comprise one or more parameters indicating timing and synchronization of the RAT, a time division duplexing (TDD) slot structure associated with the RAT, or a silence interval associated with the RAT.

4. The method of claim 1, wherein the information comprises an indication of whether the different radio access nodes are capable of utilizing multiple radio access technologies (RATs).

5. The method of claim 1, wherein the information comprises an indication of at least one of:
   an ability to access one or more core networks;
   an ability to support mobility with one or more other systems;
   an ability to support automatic traffic redirection among multiple radio channels;
   an ability to support automatic transmit power control based on dynamically changing radio interference conditions; and
   an ability to support carrier aggregation and, if carrier aggregation is supported, a combination of radio channels for which carrier aggregation is supported.

6. The method of claim 1, wherein the information comprises an indication of whether the different radio access nodes are a member of a particular system.

7. The method of claim 1, wherein the different radio access nodes cooperate in a manner to coordinate a usage of the shared radio resources.

8. The method of claim 1, wherein obtaining the information comprises obtaining the information as part of a registration process between one or more of the different radio access nodes and the SAS.

9. The method of claim 1, wherein obtaining the information comprises obtaining the information via at least one of resource requests from the different radio access nodes or periodic status updates from the different radio access nodes.

10. The method of claim 9, wherein the periodic status updates include radio environment measurements performed by the different radio access nodes.

11. The method of claim 1, wherein estimating the compatibility between the different radio access nodes comprises generating a compatibility score based on the information.

12. The method of claim 11, wherein the compatibility score comprises a multi-dimensional metric for indicating capabilities and likelihood for at least two radio access nodes of the different radio access nodes to coordinate interference and usage of the shared radio resources.

13. The method of claim 1, wherein the allocating comprises:
allocating resources on same or adjacent channels to a first set of the different radio access nodes; and
allocating resources on non-adjacent channels to a second set of the different radio access nodes estimated to be less compatible than the first set.

14. The method of claim 1, wherein the allocating comprises:
allowing a first set of the different radio access nodes to transmit at a first transmit power level; and
allowing a second set of the different radio access nodes to transmit at a first transmit power, wherein the first set of the different radio access nodes is estimated to be more compatible than the second set of the different radio access nodes.

15. An apparatus for allocating shared radio resources by a spectrum access server (SAS), comprising:
at least one processor configured to:
obtaining information regarding capability of different radio access nodes requesting use of the shared radio resources;
estimating compatibility between the different radio access nodes based on the information; and
allocating the shared radio resources to the different radio access nodes based on the estimated compatibility; and
a memory coupled with the at least one processor.

16. The apparatus of claim 15, wherein the information comprises an indication of a radio access technology (RAT) of the different radio access nodes and operating parameters associated with the RAT.

17. The apparatus of claim 16, wherein the operating parameters associated with the RAT comprise one or more parameters indicating timing and synchronization of the RAT, a time division duplexing (TDD) slot structure associated with the RAT, or a silence interval associated with the RAT.

18. The apparatus of claim 15, wherein the information comprises an indication of whether the different radio access nodes are capable of utilizing multiple radio access technologies (RATs).

19. The apparatus of claim 15, wherein the information comprises an indication of at least one of:
an ability to access one or more core networks;
an ability to support mobility with one or more other systems;
an ability to support automatic traffic redirection among multiple radio channels;
an ability to support automatic transmit power control based on dynamically changing radio interference conditions; and
an ability to support carrier aggregation and, if carrier aggregation is supported, a combination of radio channels for which carrier aggregation is supported.

20. The apparatus of claim 15, wherein the information comprises an indication of whether the different radio access nodes are a member of a particular system.

21. The apparatus of claim 15, wherein the different radio access nodes cooperate in a manner to coordinate a usage of the shared radio resources.

22. The apparatus of claim 15, wherein the at least one processor is configured to obtain the information as part of a registration process between one or more of the different radio access nodes and the SAS.

23. The apparatus of claim 15, wherein the at least one processor is configured to obtain the information via at least one of resource requests from the different radio access nodes or periodic status updates from the different radio access nodes.

24. The apparatus of claim 23, wherein the periodic status updates include radio environment measurements performed by the different radio access nodes.

25. The apparatus of claim 15, wherein estimating the compatibility between the different radio access nodes comprises generating a compatibility score based on the information.

26. The apparatus of claim 25, wherein the compatibility score comprises a multi-dimensional metric for indicating capabilities and likelihood for at least two radio access nodes of the different radio access nodes to coordinate interference and usage of the shared radio resources.

27. The apparatus of claim 15, wherein the allocating comprises:
allocating resources on same or adjacent channels to a first set of the different radio access nodes; and
allocating resources on non-adjacent channels to a second set of the different radio access nodes estimated to be less compatible than the first set.

28. The apparatus of claim 15, wherein the allocating comprises:
allowing a first set of the different radio access nodes to transmit at a first transmit power level; and
allowing a second set of the different radio access nodes to transmit at a first transmit power, wherein the first set of the different radio access nodes is estimated to be more compatible than the second set of the different radio access nodes.

29. An apparatus for allocating shared radio resources by a spectrum access server (SAS), comprising:
means for obtaining information regarding capability of different radio access nodes requesting use of the shared radio resources;
means for estimating compatibility between the different radio access nodes based on the information; and
means for allocating the shared radio resources to the different radio access nodes based on the estimated compatibility.

30. A non-transitory computer-readable medium for allocating shared radio resources by a spectrum access server (SAS), comprising instructions for:
obtaining information regarding capability of different radio access nodes requesting use of the shared radio resources;
estimating compatibility between the different radio access nodes based on the information; and
allocating the shared radio resources to the different radio access nodes based on the estimated compatibility.

* * * * *